June 21, 1927.
R. R. AMBLER
1,632,816
METHOD AND MACHINE FOR COVERING FLEXIBLE STRIPS
Filed July 26, 1923
5 Sheets-Sheet 1
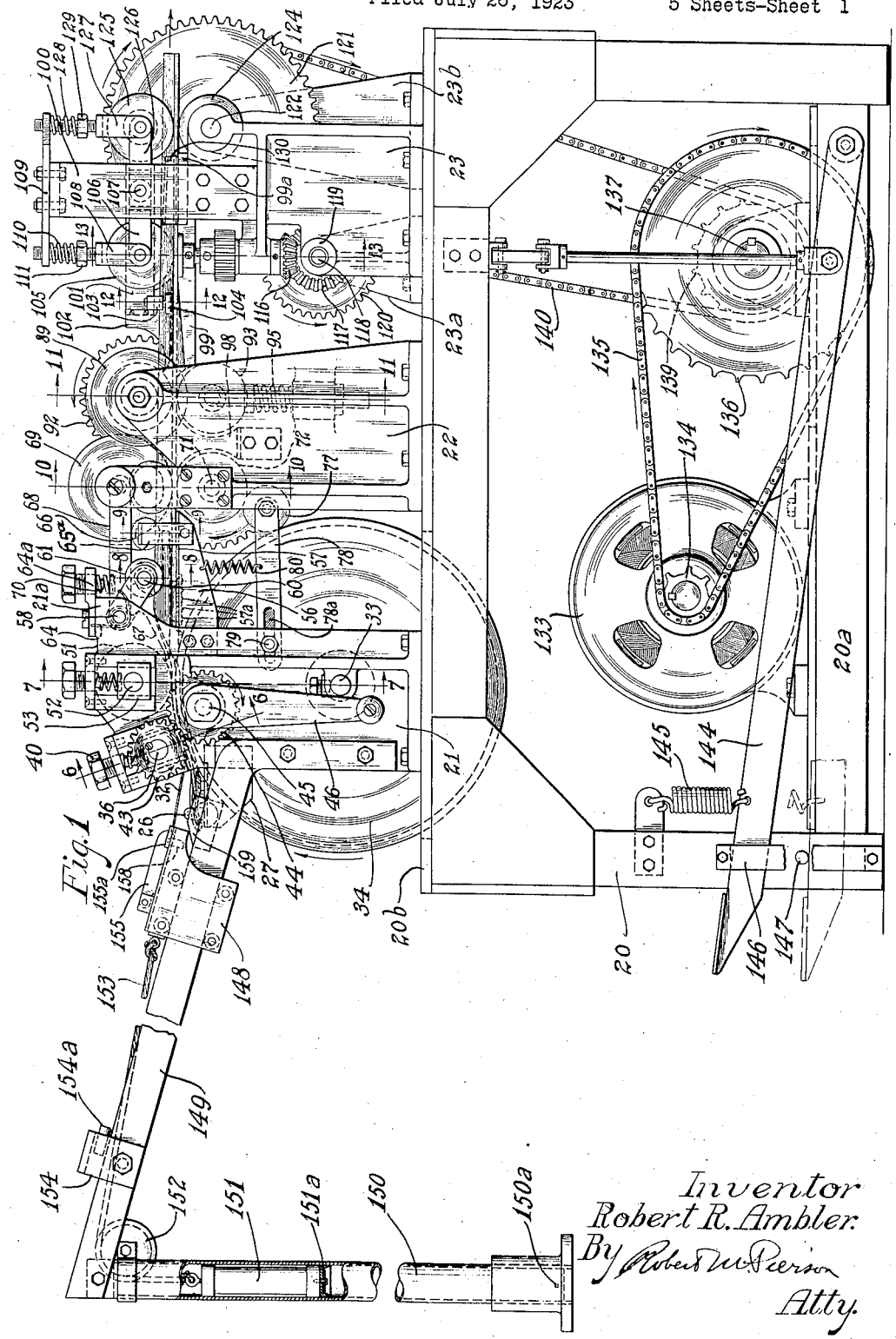
Inventor
Robert R. Ambler.
By Robert McPierson
Atty.

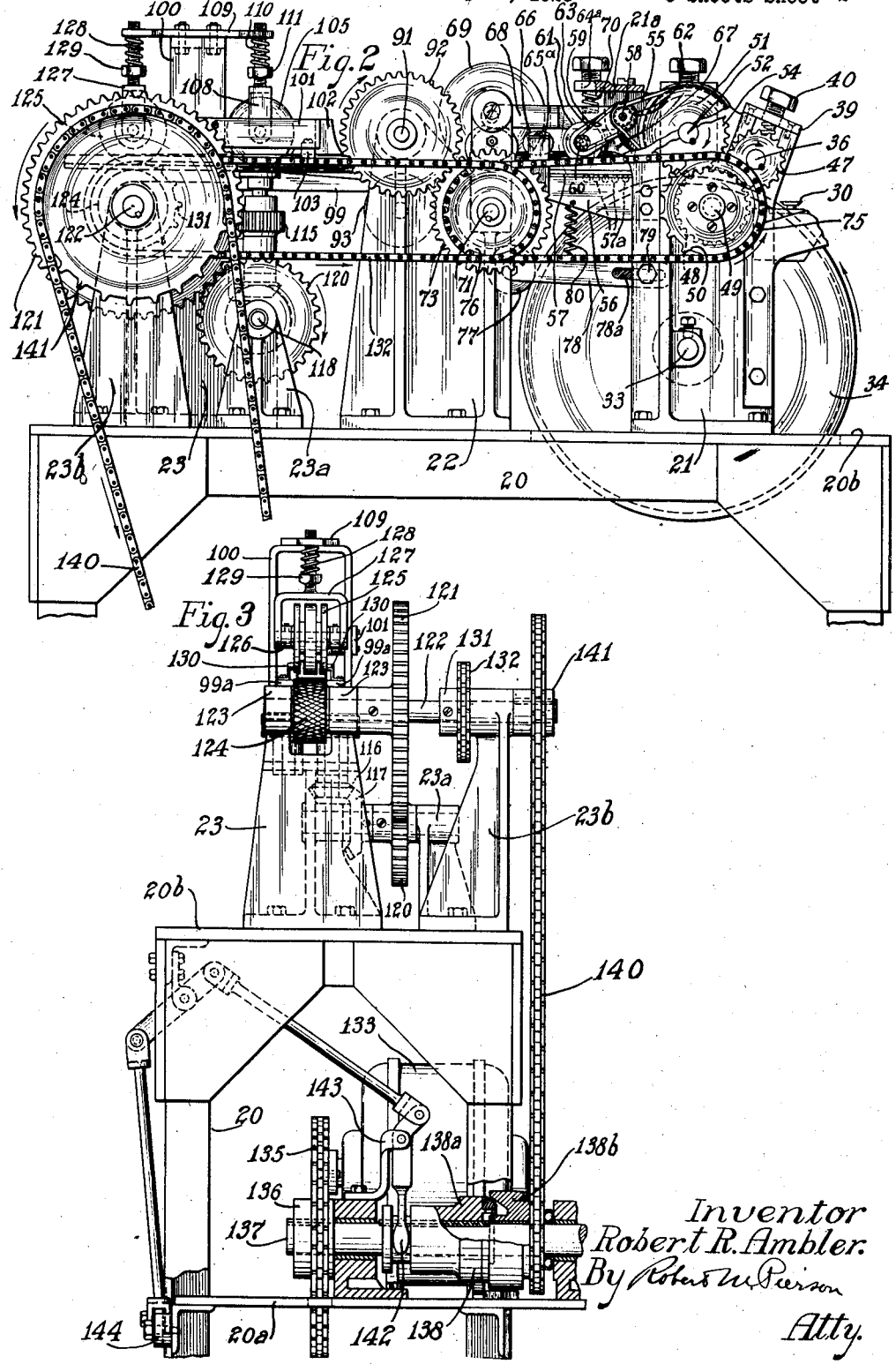

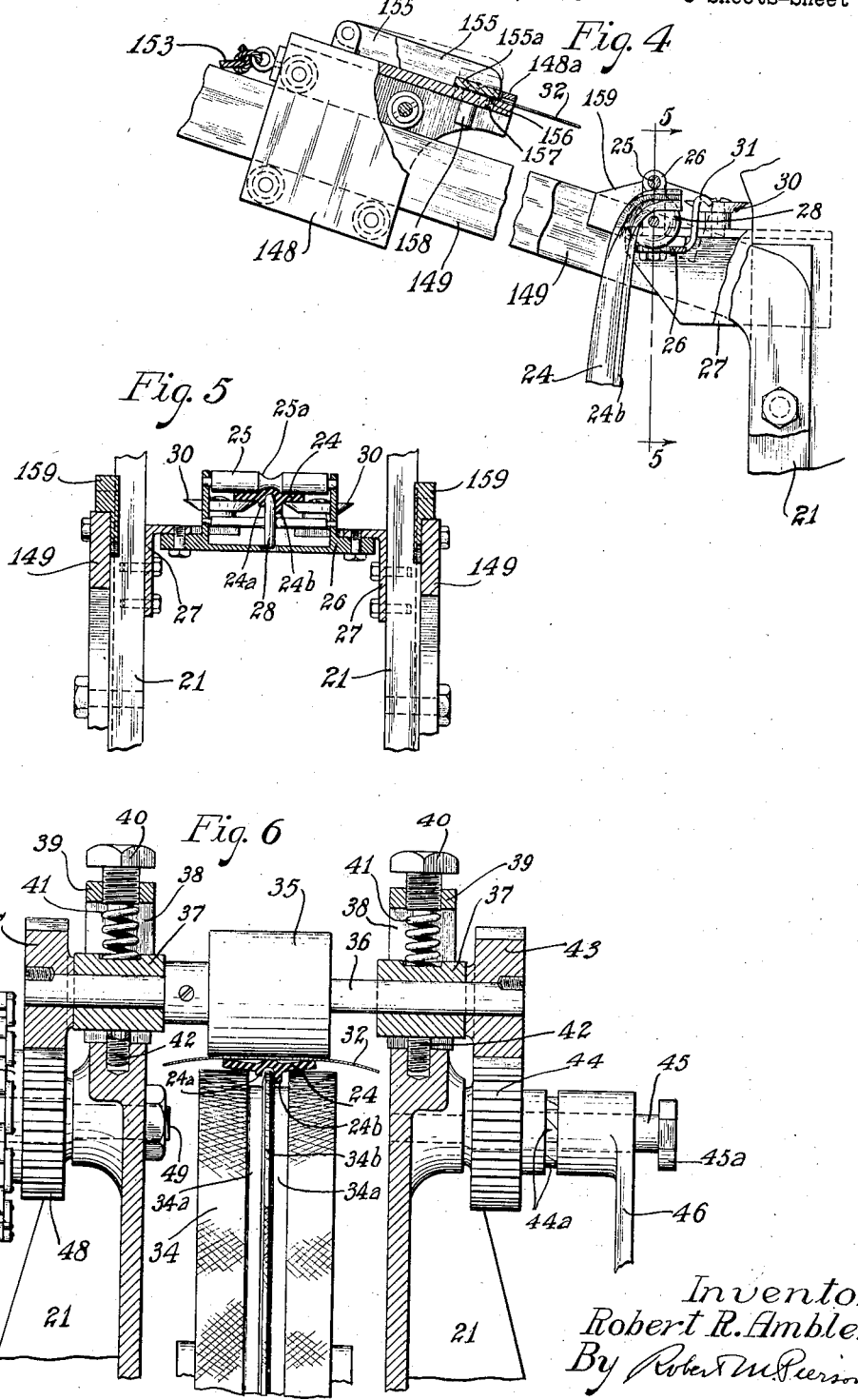

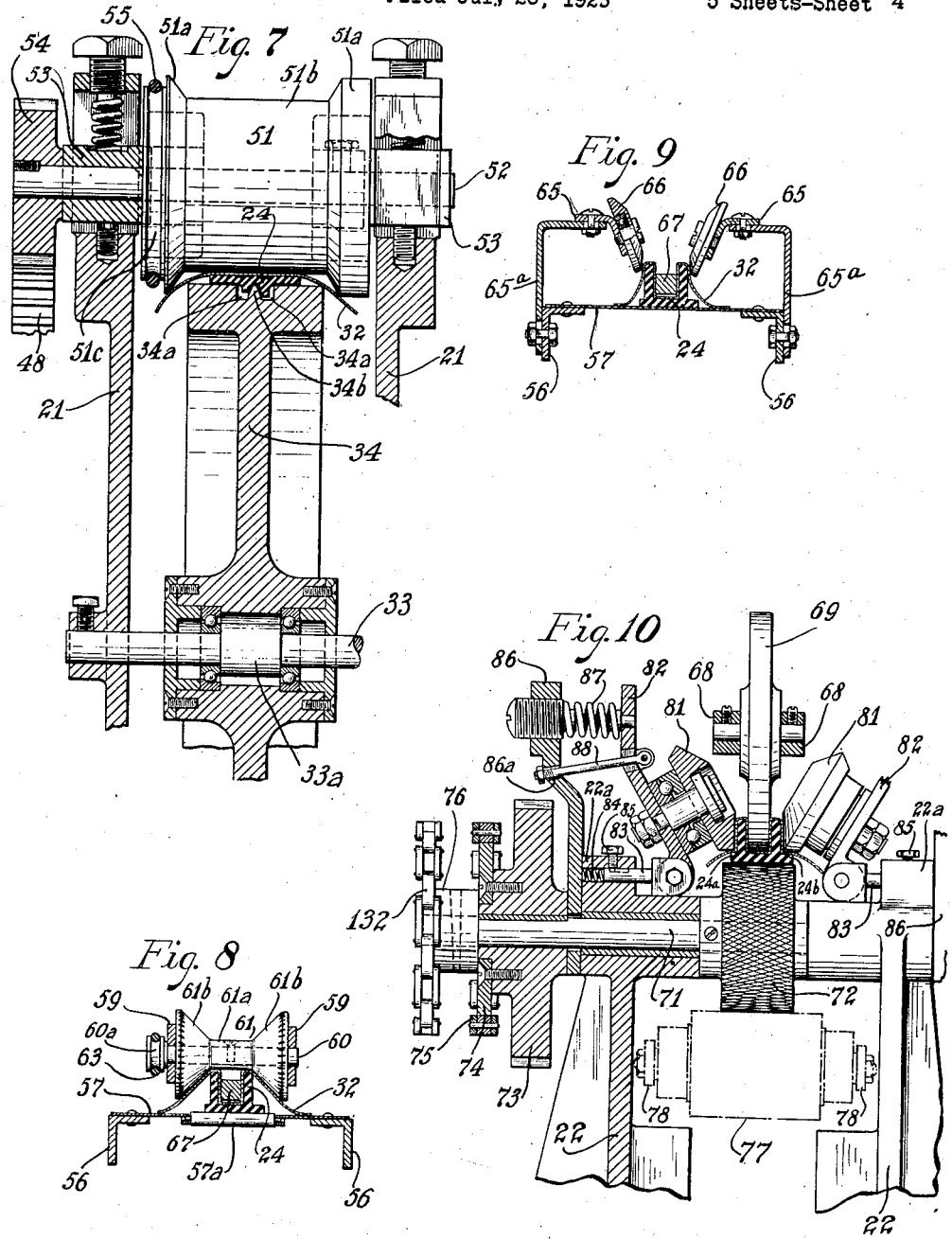

June 21, 1927.
R. R. AMBLER
1,632,816
METHOD AND MACHINE FOR COVERING FLEXIBLE STRIPS
Filed July 26, 1923   5 Sheets-Sheet 5
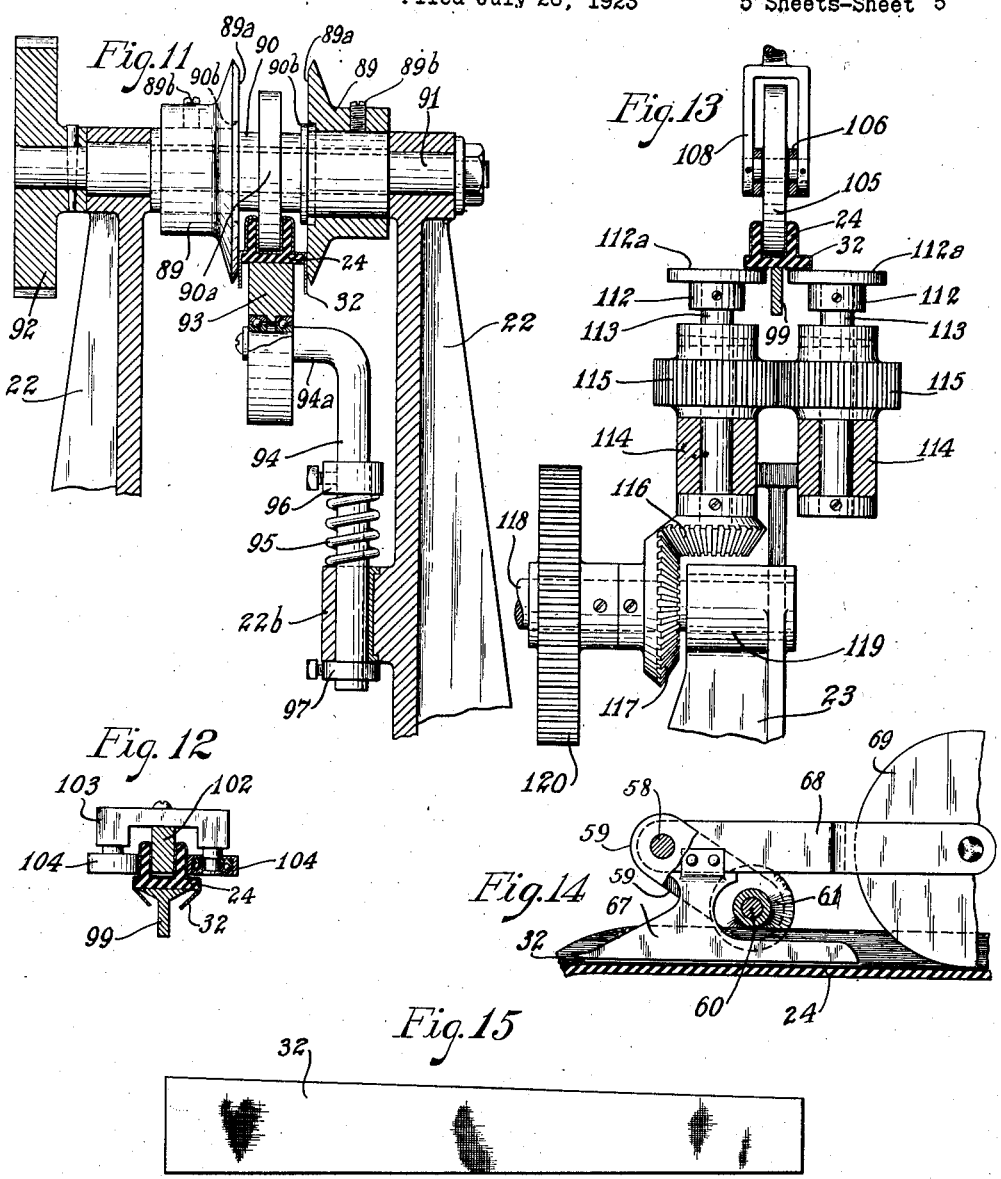
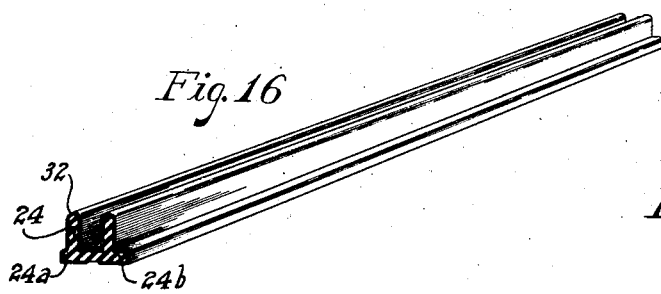
Inventor
Robert R. Ambler.
By Robert M. Pierson
Atty.

Patented June 21, 1927.

1,632,816

UNITED STATES PATENT OFFICE.

ROBERT R. AMBLER, OF AKRON, OHIO, ASSIGNOR TO THE B. F. GOODRICH COMPANY, OF NEW YORK, N. Y., A CORPORATION OF NEW YORK.

METHOD AND MACHINE FOR COVERING FLEXIBLE STRIPS.

Application filed July 26, 1923. Serial No. 653,919.

This invention relates to the art of applying a cover, such as a fabric cover, to strip material such as channel rubber, the embodiment herein described being adapted to apply fabric covers to short, longitudinally tapered lengths of vulcanized channel rubber. The type of channel rubber shown in the drawings has base flanges of unequal widths, as well as a channel of decreasing depth from end to end, being of a form adapting it to be secured to the window frame of an automobile body to serve as a guideway for the glass window therein, the edges of the window glass fitting within the channels of respective strips. The fabric is adapted to serve as an antifriction material and also as a decorative covering. My present invention is an improvement upon that described in the joint application of myself and Paul R. Rohrbacker, now Patent No. 1,555,816, of Oct. 6, 1925, the latter being adapted more particularly for the covering of channel strips of uniform cross-section throughout their length.

My chief object is to provide an improved method and an improved apparatus adapted to apply covers to strips of material, and more particularly to apply fabric covers adhesively to rubber channel strips of short length and of longitudinally tapered form.

The embodiment of my invention shown in the accompanying drawings comprises a series of driven and loosely-journalled rollers adapted to bring progressively into contact a length of tacky channel rubber, having a channel of progressively varying depth, and a fabric strip of substantially the same length, one or the other or both having an adhesive face, and to wrap said fabric strip laterally about said channel rubber and press it adhesively against the sides thereof. I do not wholly limit my invention, however, to covering all faces of the channeled strips.

Of the accompanying drawings:

Fig. 1 is a front elevation of a preferred form of machine embodying and adapted to carry out my invention, and the work therein.

Fig. 2 is a rear elevation of the same.

Fig. 3 is an elevation from the delivery end of the machine, with parts broken away and in section.

Fig. 4 is a front elevation of the work-receiving portion of the machine, and the work passing thereinto.

Fig. 5 is a section on line 5—5 of Fig. 4.
Fig. 6 is a section on line 6—6 of Fig. 1.
Fig. 7 is a section on line 7—7 of Fig. 1.
Fig. 8 is a section on line 8—8 of Fig. 1.
Fig. 9 is a section on line 9—9 of Fig. 1.
Fig. 10 is a section on line 10—10 of Fig. 1.
Fig. 11 is a section on line 11—11 of Fig. 1.
Fig. 12 is a section on line 12—12 of Fig. 1.
Fig. 13 is a section on line 13—13 of Fig. 1.
Fig. 14 is a detail view, on a larger scale, of one of the cover-applying instrumentalities.

Fig. 15 is a plan view of a fabric covering-strip.

Fig. 16 is a sectional perspective view of the finished product.

Referring to the drawings, 20 is a table having a lower shelf $20^a$ upon which is mounted power mechanism to be later described, and a top $20^b$ upon which is mounted an aligned series of journal brackets, 21, 21, 22, 22, 23, $23^a$ and $23^b$, supporting the various work-manipulating rollers, the brackets $23^a$, $23^b$ both being mated with the bracket 23.

In order that the fabric cover may be smoothly and snugly applied to all surfaces of the channel strip, it is desirable that the legs of the channel strip be progressively spread apart and the cover strip presented first to the substantially flattened channel surface thus presented, and then wrapped laterally onto the outer faces of the channel strip. The mechanism for initially spreading and flattening the channel strip is clearly shown in Figs. 4 and 5, in which 24 is the channel rubber, having channel walls or legs of decreasing height from end to end of the strip, (see Fig. 16) and having base flanges $24^a$, $24^b$ of unequal width. 25 is an elongated, horizontal, generally cylindrical roller formed at its middle with a circumferential groove $25^a$ and loosely journalled in upwardly extending ears of a bridge member 26 supported by angle members 27, 27 mounted on the adjacent faces of the brackets 21. The roller 25 is adapted to fit the inner channel faces of the strip 24 as the latter, in opened out or spread condition as shown, passes between said roller and a narrow, crowned roller 28 loosely journalled in the ears of the bridge member 26 and adapted to fit between the strip's base flanges 24ª, 24ᵇ, the latter being thrown into parallel relation to each other by the spreading of the strip. The crowned roller 28 is adapted to hold the middle portion of the spread strip in the groove of the roller 25, the floor wall of the strip naturally assuming, in the spreading of the channel, an arcuate cross-sectional form. Said floor wall thus fits the crown of the roller 28 on its lower face and the groove of the roller 25 on its upper face, while the channel walls are held flattened by the cylindrical portions of the roller 25. The arrangement of the rollers 25 and 28 is such as to sharply flex the channel strip about the latter, in turning it from a vertical position, in which it hangs by gravity, to a horizontal direction, and by such flexing to cause the legs of the channel strip to spread apart because of unequal tension at different parts of their cross-section as well as because of the direct flattening pressure of the roller 25.

A little farther along a pair of upwardly flared work-supporting and guiding rollers 30, 30 are loosely journalled, on vertical axes, on extensions of the respective angle members 27, 27, said rollers having radial upper end faces adapted to underlie the channel walls or legs of the spread strip, and said rollers extend to the base flanges of the strip so as to serve as side guides for the latter.

Between the guide rollers 30 and extending above the plane of their top surfaces is the bent upper end of a work-supporting rod 31 which is secured at its lower end to the near margin of the bridge member 26, said rod being adapted to extend between the base flanges of the channel strip, to furnish a rigid support for the medial portion of said strip so that the leading end of a covering strip, 32, may conveniently be started by hand upon the flattened upper surface of the channel 24, at the beginning of the covering operation.

The covering strip 32 comprises a tapered length of fabric such as velvet or felt, the upper surface of which is adapted to form an anti-friction facing for the channel of the strip, its lower surface being treated with cement to cause it to adhere to the channel rubber 24. A hold-back device for the covering strip, shown in Fig. 4, will be described hereinafter.

The mounting of the next set of rollers comprises a fixed, horizontal shaft 33 secured in the journal brackets 21, and on said shaft is loosely journaled a large roller 34, the shaft being formed with a circumferential flange 33ª (Fig. 7) at its middle, embraced by bearings secured in the hub of the roller, for preventing lateral movement of the latter. The periphery of the roller 34 is knurled and formed with a pair of adjacent, circumferential grooves 34ª, 34ª, separated by a medial rib 34ᵇ adapted to extend between the base flanges 24ª, 24ᵇ of the channel strip, the grooves 34ª being adapted to accommodate said flanges.

A cylindrical roller 35 (Fig. 6) adapted to cooperate with the roller 34, is mounted on a horizontal, rotatable shaft 36 journaled in vertically slidable bearing blocks 37, 37 mounted in suitable guideways 38, 38 formed in the respective journal brackets 21. Said guideways 38 are provided with bridge plates 39, 39 through which are threaded adjusting bolts 40, 40 bearing on compression springs 41, 41 for yieldingly urging the bearing blocks 37 and roller 35 toward the roller 34. Adjustable stop screws 42, 42 are threaded into the floors of the guideways 38 to limit the downward movement of the roller 35.

On the front end of the shaft 36 is secured a gear 43, meshed with a gear 44 loosely journaled on a stub shaft 45 projecting from the nearer journal bracket 21. The hub of the gear 44 is formed with clutch teeth 44ª adapted to be engaged by teeth formed on a hand crank 46, the latter being rotatably and slidably mounted on the stub shaft 45 and retained thereon by a flange 45ª on the end of said shaft, said crank being adapted for driving the roller 35 and associated parts by hand, as at the beginning of a covering operation.

The rear end of the shaft 36 is provided with a gear 47 meshed with gear 48 loosely journalled on a stub shaft 49 projecting from the rear journal bracket 21, and on a common hub with said gear 48 is a sprocket 50, adapted to be driven through parts hereinafter described, for driving the work.

The roller 35 is adapted to receive the flattened channel rubber 24, with the fabric strip 32 thereon, and lightly hold it in frictional engagement with the roller 34 as both rollers are rotated, to carry said channel and fabric strip forward to a presser roller 51, the latter also acting against the large roller 34, as shown in Fig. 7. Said presser roller 51 is of spool shape, being formed with beveled end flanges 51ª, 51ª at each end of a cylindrical portion 51ᵇ, and is secured on a horizontal shaft 52 journaled in bearing blocks 53, 53, said blocks being mounted in suitable guideways in the respective journal brackets 21 and yieldingly urged toward the roller 34 in the same manner as the journal blocks 37 hereinbefore described. Secured on the rear end of the shaft 52 is a gear 54, meshed with the gear 48 heretofore described. The roller 51 is adapted to exert sufficient pressure upon the channel strip 24 to render its upper surface substantially flat and stick the covering strip 32 thereto, throughout the width of said surface, the roller flanges 51ª bearing upon the margins of the covering strip 32 and initiating the downward folding movement thereof.

Extending forward from the respective journal brackets 21, below the bite of the rollers 51, 34, are supporting arms 56, 56, (Figs. 1, 2, 8 and 9), connected by a transverse plate 57 formed with transverse slots in which are journaled a plurality of antifriction, work-supporting rollers 57ª, 57ª. The plate 57 is adjacent the periphery of the roller 34, and the rollers 57ª, 57ª are adapted to support the work as the latter passes from the rollers 51, 34, the work resuming its normal channel shape when freed from their distorting pressure.

Above the plate 57 is a shaft 58 having its ends fixed in overhanging projections 21ª, 21ª formed on the brackets 21. Loosely pivoted on the shaft 58 and extending toward the delivery end of the machine, are a pair of parallel arms 59, 59 having a shaft 60 journaled in their free ends, one end of said shaft being provided with a grooved pulley 60ª (Fig. 8). Secured on the shaft 60 between the arms 59 is a roller 61, said roller being formed with a cylindrical middle portion 61ª, in length as long as the width of the rubber channel across the channel legs and adapted to press the cover strip against the edges of said legs, and with frusto-conical, roughened end flanges 61ᵇ, 61ᵇ adapted to bend downward the margins of the cover strip.

Loosely journaled on the shaft 58 is an idler pulley 62 having two coaxial belt grooves, in one of which is mounted a belt 55 running in a groove 51ᶜ on one end of the roller 51, and 63 is a belt mounted in the other groove of the roller 62 and on the pulley 60ª, for driving the roller 61 from the roller 51, (Fig. 2). A hinge-spring 64 mounted on the shaft 58, having one of its ends anchored in an aperture in a plate 64ª connecting the overhanging projections 21ª, and its other end engaging one of the arms 59, is adapted to urge the roller 61 downward against the work while permitting it to rise to compensate for the increasing height of the legs of the channel rubber, the latter being fed through the machine with its smaller end foremost.

Mounted on the outer ends of the respective fixed arms 56 above described are vertically adjustable brackets 65ª, 65ª (Fig. 9), the upper ends of which are bent toward each other and provided with adjustably mounted supports 65, 65 on each of which is journalled a stitching roller 66, said rollers having frusto-conical, work-engaging faces. The rollers 66 are adapted to initiate the stitching of the cover 32 upon the outside of the leg portions of the channel rubber 24, said leg portions being held rigidly upright, against the pressure of said rollers, by a metal shoe 67 (Fig. 14) fitting within the channel of said strip, said shoe extending from a point adjacent the roller 51 to just beyond the rollers 66, and being formed with and supported solely by a single leg adjacent the roller 61, said leg being secured to an arm 68 pivotally mounted on the shaft 58 between the arms 59. The arm 68 extends forward over the rollers 66 and has a forked end in which is journalled a disc-like, channel-entering roller 69, adapted to operate between the legs of the channel rubber 24 and against the bottom of the latter's channel, (Fig. 10) said roller being yieldingly urged against the work by a compression spring 70 interposed between the upper side of the arm 68 and an adjustable spring screw 70 mounted in the plate 64ª (Figs. 1 and 2).

Journalled in the brackets 22, below the roller 69 is a horizontal shaft 71 (Fig. 10), upon which is mounted, between said brackets, a knurled roller 72 adapted to aid in propelling the work and to serve as a rigid support therefor while the roller 69 and other instrumentalities operate thereon. On the rear end of the shaft 71 are secured a spur gear 73, a sprocket 74, and a sprocket 76, the sprocket 74 being connected by a sprocket chain 75 with the sprocket 50 hereinbefore described, and the sprocket 76 being adapted to be driven, by means hereinafter described.

For driving the large roller 34 from the knurled roller 72 just described, a friction surfaced roller 77 (Figs. 1, 2 and 10), is journalled in the free ends of a pair of arms 78, 78 which are pivotally and slidably mounted on pins 79, 79, secured to the respective journal brackets 21 and extending through longitudinal slots 78ª, 78ª, in the arms 78. Tension springs 80, 80 connect the respective arms 78 to the respective fixed arms 56, for yieldingly urging the roller 77 into frictional driving contact with the peripheries of the rollers 72 and 34, said roller 77 being thus adapted to rotate the roller 34 when the roller 72 is driven.

At each side of the channel-entering roller 69 is an obliquely disposed roller 81 (Fig. 10), each having two frusto-conical, working faces joining each other at right-angles, being thus adapted to press the cover strip into the angles formed by the legs and the base flanges of the channel strip. The rollers 81 are journaled upon brackets 82, 82 which are hinged in the forked ends of slide-bolts 83, 83 mounted in apertured bosses 22ª, 22ª, formed on the respective journal brackets 22, above the shaft 71. The slide-bolts 83 are urged toward each other by compression springs, one of which is shown at 84, (Fig. 10). Set screws 85, 85, threaded through the bosses 22ª, and engaging longitudinal slots in said slide bolts, serve to limit the axial movement thereof.

Adjustment brackets 86, 86 extend upwardly from the journal brackets 22 adjacent each hinged bracket 82, and compression springs 87 are interposed between the upper ends of said adjustment brackets and hinged brackets to urge the latter and the rollers 82 carried thereby toward the work, this movement being limited by adjustable links such as 88 (Fig. 10), pivoted on the respective hinged brackets 82, extending through respective apertures such as 86ª in the adjustment brackets 86, and provided with retaining nuts on their ends. The hinged brackets 82 are normally held at an angle which will present the rollers 81 to the work with one of their contacting surfaces in a vertical position and the other in horizontal position, being thus adapted to bear against the entire outer surface of the respective channel legs and the entire upper surfaces of base flanges 24ª, 24ᵇ, to press the cover strip 32 thereupon.

For folding the cover strip 32 over and onto the vertical edge-faces of the base flanges a pair of driven rollers 89, 89 (Fig. 11), having their adjacent work-contacting end faces 89ª, 89ª, radial and parallel with each other, are secured upon an axial bushing 90 keyed to a shaft 91 journalled in the brackets 22, and a gear 92 secured on the rear end of said shaft is meshed with the gear 73 above described. The bushing 90 is formed with a circumferential, channel-entering flange 90ª having a cylindrical tread adapted to bear against the floor of the channel strip to aid in propelling the latter, the strip being yieldingly pressed upward against said tread by a roller 93 presently to be described. The rollers 89 are secured to the bushing 90 by set-screws 89ᵇ, 89ᵇ, and counterbored to accommodate flanges 90ᵇ, 90ᵇ, on said bushing, so that they may be secured in adjusted positions, to operate upon channel strips of different widths, or upon strips in which the channel floor is at a different position in the cross-section of the strip, the axial position of the channel-entering flange 90ª being fixed. The flanges 90ᵇ may be formed at such positions on the bushing 90 as to serve as stops for the rollers 89 in adusting either or both of the latter for certain standard types or sizes of channel rubber.

For supporting the work and holding it in driving contact with the channel-entering flange 90ª of the bushing 90, a roller 93 is journaled upon the horizontally bent end portion 94ª of a vertical supporting rod 94, the latter being slidably keyed in an apertured projection 22ᵇ formed on the inner face of one of the journal brackets 22. A compression spring 95 is mounted upon said rod, between the projection 22ᵇ and a collar 96 secured on said supporting rod, for urging the roller 93 upward against the work, the upward movement of said rod being limited by a stop collar 97 on its lower end adapted to abut the projection 22ᵇ.

Between the rollers 72 and 93 is a plate 98° (Fig. 1) for supporting the work as it travels between said rollers, said plate being secured, below the work, to one of the journal brackets 22. For supporting the work as it passes beyond the roller 93, a bar 99 extends from a point adjacent said roller to the journal bracket 23, said bar being formed on each side with laterally extending flanges 99ª, 99ª (Fig. 3), by which it is attached to said journal bracket.

A supporting bracket 100 shaped like an inverted U, extends upward from the journal bracket 23, its legs being secured to opposite sides thereof. Secured to the rear leg of the bracket 100 is an arm 101 extending toward the rollers 89, said arm being laterally bent at its outer end and having secured thereto a vertical guide-plate 102 (Figs. 1, 2 and 12), adapted to occupy the channel of the strip 24 as the latter passes, to support the legs thereof against the pressure of rollers 104, 104, journaled on vertical axes on a yoke 103 secured on the plate 102, said rollers being adapted to bear against the outer faces of the respective legs of the channel rubber, accurately to guide the latter toward the succeeding work manipulating members, which includes a channel-entering roller 105. The latter is journaled in a bearing-fork 106 having its stem pivoted on a horizontal, stationary rod 107 secured at its ends in the respective legs of the supporting bracket 100. The roller 105 is adapted to be yieldingly urged downward against the work by a second bearing-fork 108, which extends upward from the journal of said roller and has a threaded stem projecting through an aperture in the overhanging end of a plate 109 secured to the top portion of the supporting bracket 100, said stem having a compression spring 110 thereon, between said plate and an adjusting nut 111 on said stem. The roller 105 is adapted to hold the work accurately in position upon the supporting plate 99 while the lateral margins of the cover strip 32 are folded under the base of the channel strip, the adjacent portion of said plate 99 being narrow, as shown in Fig. 13, to permit said cover margins to be folded in against the bottom face of the channel strip.

Below the roller 105, and at opposite sides of the supporting plate 99, a pair of driven rollers 112, 112 (Fig. 13), each having a radial, horizontal, work-engaging face 112ª adapted to wipe the margins of the cover strip 32 toward the middle of the under surface of the channel strip 24, said working faces being notched about their peripheries (Fig. 13) to increase the friction of the roller against the covering material.

The width of the cover strip 32 is such that its edges do not meet along the bottom of the channel rubber, so that the channel strip may be supported upon the narrow portion of the plate 99 without interfering with the covering operation.

The rollers 112 are mounted on the upper ends of vertical shafts 113, 113, which are journaled in adjacent bearings 114, 114 formed on the journal bracket 23, said shafts being provided with meshed spur gears, 115, 115 for compelling them to rotate at the same speed. The lower end of the rear shaft 113 is provided with a bevel-gear 116 meshed with a bevel gear 117 mounted on a horizontal shaft 118 journaled in the bracket 23ª and in a bearing 119 formed on the bracket 23. 120 is a gear secured on the shaft 118 and meshed with a driving gear 121 (Figs. 1 and 2).

The gear ratios are such as to drive the rollers 112 at a perpiheral speed greater than the longitudinal speed of the work, as such relatively high speed of said rollers results in a smooth application of the cover-strip margins to the base of the channel strip.

The gear 121 is secured to a main drive shaft 122 journalled in the bracket 23ᵇ and bearings 123, 123 (Fig. 3) formed on the journal bracket 23. A knurled roller 124 (Figs. 1, 2 and 3), is secured on said shaft between said bearings, said roller being the last of the work-supporting rollers, and being adapted to aid in driving the work and to support it against the force of a presser roller 125. The latter is formed with two, deep, circumferential grooves adapted to accommodate the upstanding leg portions of the covered channel strip while flanges defining said grooves engage the channel floor and base flanges of the strip to press said channel strip against the roller 124 and thereby press the cover strip 32 firmly onto the under side of its base. The roller 125 is journalled in a horizontal bearing fork 126 and a vertical bearing fork 127, said horizontal bearing fork being pivotally secured to the rod 107 to prevent horizontal traveling of said roller, and the vertical bearing fork 127 being mounted in the overhanging plate 109 and provided with a compression spring 128 bearing against the under side of said plate and against a nut 129 on the threaded stem of said vertical bearing fork, yieldingly to urge said roller downward upon the work. A pair of side guides 130, 130 are mounted on the respective flanges 99ª of the work-supporting plate 99, to guide the work from the roller 105 to the roller 125.

For driving the various rollers hereinbefore described, a sprocket 131, secured on the driving shaft 122, is connected by a sprocket chain 132 with the sprocket 76, for driving the shaft 71 and mechanism connected therewith, and sprocket 74 on said shaft, through sprocket chain 75 and sprocket 50, is adapted to drive the shaft 49 and parts operatively connected therewith.

For driving the main drive shaft 122, a motor 133 (Figs. 1 and 3) is mounted upon the lower shelf 20ª of the table 20, the shaft of said motor being provided with a sprocket 134 connected by a sprocket chain 135 with a relatively large sprocket 136 keyed to a counter shaft 137, journaled in bearings mounted on said shaft. On the counter-shaft 137 is a friction-clutch 138, one member of which, 138ª, is slidably keyed thereon. The other member, 138ᵇ, is loosely journaled on said counter-shaft and is provided with a sprocket 139 connected by a sprocket chain 140 with a sprocket 141 on the rear end of the driving shaft 122. The clutch member 138ª is provided with a shipper-lever 142, said lever being fulcrumed on a bracket 143 and adapted to be actuated, through a series of links and levers of well-known construction, by a foot-lever 144 projecting beyond the table 20 at the work receiving end of the machine, and normally held in an elevated, inoperative position by a tension spring 145 connecting it with the frame of the table 20. A guide-plate 146, secured to the adjacent leg of the table 20, is adapted to limit the movement of said foot-lever, and a stud 147 projects from the table leg, behind the guide-plate 146, and is adapted to hold the lever 144 in depressed or operative position, as shown in broken lines in Fig. 1, when it is desired to run the machine continuously.

The elastic channeled strip 24, in being propelled through the machine by the several driven rollers, may be subjected to substantial longitudinal tension or stretch, and it is desirable that the cover strip 32 be applied thereto in an equally or more stretched condition, so that the subsequent contraction of said channel will not cause said cover to buckle or wrinkle. The cover strip 32 also requires to be guided accurately onto the channel strip, and to accomplish this object and to impart the required tension to the cover strip as it passes onto the channel rubber, a hold-back carriage 148 is mounted at the work receiving end of the machine and provided with means for clamping the rear end of the cover strip. Said carriage is provided with wheels engaging the upper and lower edges of a pair of spaced-apart guide rails 149, 149, the latter being secured to the journal bracket 21 and to the top of an upright, cylinder-like support 150, the latter being of such height that the rails 149 slope downward toward the machine. Within the support 150 is a weight 151 having its lower end provided with lip-gasket 151ª to form a seal with the inner wall of said support, and an aperture 150ª is provided in the lower end of said support for the admission and escape of air below said weight, said support being thus adapted to serve as a dash-pot to prevent violent return of the carriage by the weight 151 (Fig. 1).

A sheave 152 is rotatably mounted between the rails 149, at the top of the support 150 and a cable 153, passing over the sheave, connects the weight 151 and carriage 148. Thus the weight 151 normally holds the carriage at the upper end of the inclined rails 149, where it abuts a stop, comprising a bracket 154 adjustably mounted upon said rails and provided with buffer pads, one being shown at 154a, to cushion the carriage.

The top of the carriage 148 is provided with a pair of hinged arms 155, 155 (Fig. 4), connected at their free ends by a cross-piece 155a, said cross-piece having a plurality of sharp claws or pins 156 projecting from its bottom face and registering with apertures such as 157 in the top face of said carriage, for anchoring the rear end of the cover strip 32, the latter being threaded under a bridge 148a on said carriage (Fig. 4) and adapted to assure disengagement of the covering strip when the cross-piece 155a is lifted. A pair of studs 158, 158 are secured to the under face of the cross-piece 155a at opposite ends thereof and project through suitable apertures in the top face of the carriage 148, and a pair of cam plates 159, 159 are mounted on the respective guide rails 149 adjacent the covering machine, said cam plates having inclined faces adapted to engage the respective studs 158, as the carriage 148 is drawn toward the covering machine, and by raising said studs and cross-piece 155, as shown in broken lines in Fig. 4, to release the cover strip from the carriage, the bridge 148a causing the cover strip to disengage from the pins 156, and permit the weight 151 to return the carriage to its position abutting the stop 154.

In the operation of my machine, a vulcanized rubber channel strip 24, having a coating of cement applied thereto, is started into the machine by manually spreading the channel legs of the strip at the end thereof where their height is least, passing said end between the rollers 25, 28 and as far forward as the guide rollers 30. Next, the narrow end of the fabric covering strip 32, one face thereof being cemented, is applied, with its cemented side downward, to the flattened upper face of the channel rubber 24, at the forward end thereof, and the wide rear end of said covering strip is attached to the carriage 148 in the manner above described. By applying the narrow end of the cover strip first, and anchoring its wide end on the carriage, more nearly the entire structure of the cover strip may be put under longitudinal tension than would be possible were the ends reversed.

The next step is the manual operation of the machine by means of the handcrank 46, which is rotated clockwise as viewed in Fig. 1 to rotate all the work-driving members and propel the work forward until its leading end rests upon the rollers 57a journalled in the plate 57. The foot lever 144 is then depressed, whereupon the machine is driven by the motor 133, propelling the work therethrough, folding and pressing the cover strip about the channel strip, and ejecting it from the rolls 124, 125 into a suitable receptacle (not shown).

It will be observed that the roller 61 (Fig. 8), is so yieldingly held downward upon the work that it may rise to compensate the increasing height of the channel legs of the strip while being driven either by contact with the work or by the belt 63. In practice I find it advisable to have the speed ratios such that it will be driven by the belt rather than by contact with the work, but in either case the flanges 61b, being of greater diameter than the cylindrical portion of the roller, move faster than said portion, so as to effect a definite downward and forward wiping of the fabric margins which draws the fabric snugly over the upper edges of the channel legs notwithstanding their increasing height and the consequent oblique line of fold with respect to the length of the fabric strip.

Since the fabric margins, in passing from the roller 61 to the rollers 66 (Fig. 9) move inward toward the channel strip, they pass out of firm contact with the flanges 61b of the roller 61 near the lowermost part of said flanges, so that the ascending portion of the latter do not exert any substantial lifting force upon the fabric margins. The shoe 67 coacts with the flanges 61b of the roller 61 to hold the legs of the work upright.

The hold-back carriage, while I do not wholly limit my claims to this type of fabric tensioning means, holds the wide rear portion of the fabric strip in a spread condition and maintains a substantially constant tension throughout the unapplied part of the fabric strip until the latter has almost completely passed onto the channel strip. The fabric strip may be of such length as to project somewhat from the trailing end of the channel strip, so that the hold-back carriage will maintain the tension of the fabric strip until it has been presented to the channel strip throughout the length of the latter.

The hold-back device is adapted to hold the covering strip by fixed engagement therewith, as distinguished from the rolling or sliding engagement of ordinary tensioning devices heretofore used, and to travel with the covering strip. Thus the ready mounting of each successive covering strip, and the tensioning thereof until they have been applied substantially to their trailing ends, are made possible and no tensioning device for the covering strip is required to be fixedly positioned adjacent the meeting point of the channel strip and covering strip.

The roller 34 is of such size as to provide an arcuate support of slow curvature for the channel strip as the covering strip is initially applied thereto, whereby excessive attenuation of the strip by the pressure of the rollers 35 and 51 is avoided, and said roller 34, being of large diameter, is adapted to coact with both of the rollers 35 and 51 without excessive longitudinal flexure of work as it passes from the roller 35 to the roller 51. This provides a simple arrangement by which said rollers 35 and 51 may be positioned so close together as to avoid flexing of the channel strip back toward normal position before the covering strip has been firmly pressed thereon by the roller 51.

My invention is susceptible of modification within its scope and I do not wholly limit my claims to the specific apparatus shown, nor to the exact procedure described. Particularly I do not wholly limit them to applying the covering strip to all faces of the channeled strip, since some of the advantages of my invention could be had in applying a covering strip of such width as to cover only a part or all of the inner channel surface of the channeled strip.

I claim:

1. The method of applying a covering strip to a length of flexible strip material which comprises attaching the leading end portions of the two together and feeding forward the said end portions to draw the two progressively together while guiding them into progressive contact with each other and tensioning the covering strip by fixed engagement with its last-applied end portion.

2. A method as defined in claim 1 in which the covering strip is progressively wrapped laterally about the length of strip material during the feeding movement.

3. The method of adhesively applying a covering strip to a length of strip material formed with a channel of progressively varying depth, which comprises spreading open the channel of said strip material at the end where its depth is least, attaching an end of the covering strip to the inner channel surface of said opened part, and longitudinally feeding said channelled strip to draw the cover thereupon while tensioning said covering strip by continuous engagement with a given part of its trailing end portion.

4. In a machine for applying a covering strip to a channel strip, the combination of means for longitudinally feeding said channel strip, means for progressively opening the channel of said channel strip, means for so guiding said covering strip longitudinally onto said channel strip that it first contacts said channel strip along the inner channel surface of the latter, and means engaging said covering strip and traveling therewith for holding it under tension as it is applied to the channel strip.

5. In a machine for applying a covering strip to a channel strip, the combination of means for longitudinally feeding said channel strip, means for so guiding said covering strip longitudinally onto said channel strip that it first contacts said channel strip along the inner channel surface of the latter, means for wrapping said cover laterally, in opposite directions, about said channel strip, and means engaging said covering strip, and traveling therewith for holding it under tension as it is so wrapped.

6. In a machine for applying a covering strip to a length of strip material, the combination of a set of rollers adapted to feed said strip material and guide said covering strip longitudinally onto said strip material and wrap it laterally about the latter, a pivoted arm disposed longitudinally of the work and constituting a mounting for one of said rollers, yielding means urging said arm about its pivot toward the work, and driving means for said roller including a drive-member journalled coaxially with relation to the pivot of said arm.

7. In a machine for applying a covering strip to a length of strip material, the combination of a series of rollers adapted to apply said covering strip longitudinally to said strip material, a hold-back device for said covering strip comprising an anchoring member provided with claws for engaging the covering strip, means for automatically retracting said anchoring member from the covering strip when said hold-back device has reached a determinate position, and a member so positioned on said hold-back device as to assure disengagement of the covering strip from said anchoring member when the latter is so retracted.

In witness whereof I have hereunto set my hand this 25 day of July, 1923.

ROBERT R. AMBLER.